Patented Apr. 1, 1941

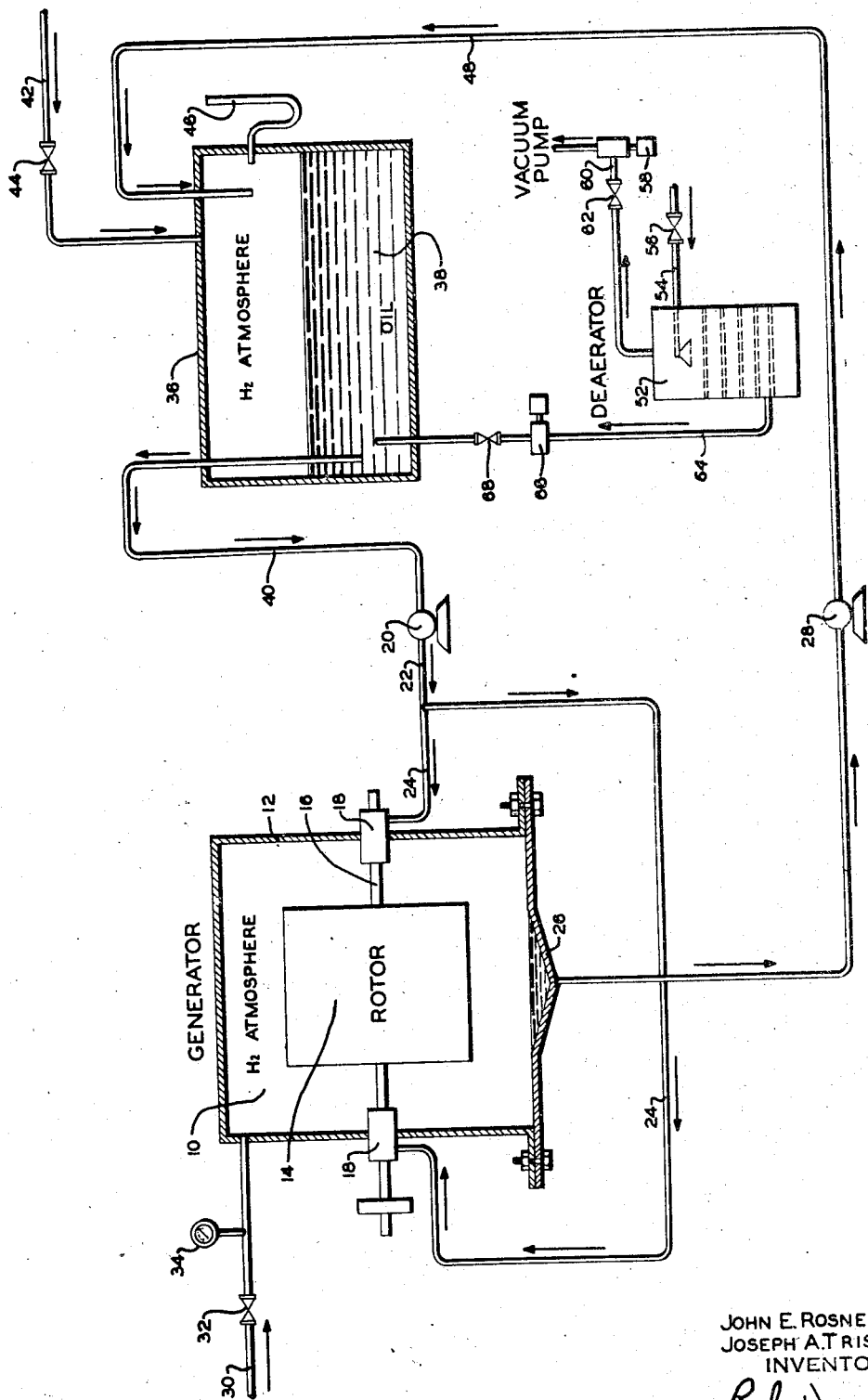

2,237,253

UNITED STATES PATENT OFFICE 2,237,253

LUBRICATING SYSTEM

John E. Rosnell, Bound Brook, N. J., and Joseph A. Triska, Great Neck, N. Y., assignors to The Texas Company, New York, N. Y., a corporation of Delaware Application March 30, 1939, Serial No. 264,900

5 Claims. (Cl. 184—6)

This invention relates to lubricating systems and more particularly to the lubricating of the bearings of machines such as electric generators which are constructed so that the rotation of a member will take place in an atmosphere of hydrogen or some other gas lighter than air.

Hydrogen cooled machines such as electric generators and the like are becoming increasingly important from a commercial standpoint. By replacing the normal atmosphere within the machine with hydrogen it is found that the air resistance to a high speed rotor is substantially decreased and a marked increase of power output is obtained from such a unit. Difficulty has been experienced, however, in maintaining the hydrogen atmosphere within the generator casing uncontaminated with air due in substantial part to the fact that the oil used in lubricating the bearings usually contains entrained air and also air in solution which is subsequently liberated within the generator casing.

It is the principal object of this invention to provide a system whereby the bearings of a machine such as an electric generator operated in an atmosphere of a gas lighter than air such as hydrogen may be efficiently lubricated without the danger of contaminating the hydrogen with air introduced into the machine with the lubricating oil.

In carrying out the invention, the lubricating oil prior to its being pumped to the generator bearings is saturated with hydrogen or with any other gas which is the same as that used in the machine to be lubricated. Any make-up oil which it is necessary to add to the supply is first de-aerated and then saturated with the light gas. In this manner the oil which is pumped to the bearings of the machine will never contain any appreciable quantities of air which could be liberated within the machine. The used oil taken from the machine can, of course, again be saturated with the light gas after which it will be again circulated through the bearings of the machine.

For a further description of the invention reference may be had to the accompanying drawing in which the single figure illustrates diagrammatically a system embodying one form of the invention.

Referring to the drawing, a generator 10 having an air-tight casing 12 is provided with a rotor 14 mounted on a shaft 16 journaled in oil-sealed bearings 18. The lubricating oil is adapted to be forced by means of a pump 20 through a conduit 22 and branch conduits 24 to the bearings 18. The used oil will trickle down the inside of the casing 12 and will collect in a sump 26 from which it will be drawn off by means of a pump 28 to be used again as will be described hereinafter. The casing 12 is adapted to be filled with hydrogen through a pipe 30 having a valve 32 and a pressure gauge 34. The rotor 14 will thus rotate in an atmosphere of hydrogen and if the casing 12 is tight the only way for air to enter will be through the oil passing into the bearings 18.

Although the drawing and the description refer to the use of hydrogen as the gas to be contained within machine 10, it is to be understood that helium or any other light gas which is inert with respect to the metallic surfaces of the machine and which does not react with lubricating oil may be also used.

If the air can be kept out of the oil entering the bearings, it is obvious that the machine could be used for long periods without the hydrogen contained therein becoming appreciably contaminated or diluted with air. To this end provision has been made for keeping air out of the lubricating oil and also for maintaining the oil saturated with the hydrogen to be used in the machine 10. A closed tank or vessel 36 is adapted to contain a quantity of lubricating oil 38 which may be drawn through the pipe 40 and forced by pump 20 into the bearings 18. The oil 38 in the vessel 36 is adapted to be maintained under a blanket of hydrogen which may be admitted to the vessel 36 through pipe 42 having a valve 44. It is preferred that the hydrogen within the vessel 36 be maintained at a pressure above atmospheric which pressure can be indicated as by means of a manometer 46. The used oil, as has been pointed out hereinbefore, is drawn from the sump 26 by means of pump 28 and forced through a conduit 48 into the vessel 36.

It may be necessary from time to time to add or supply make-up oil to that used in the system and it is preferred that all possible air be first removed from this make-up oil. For this purpose a deaerator 52 is shown as being connected to a source of oil as by means of the pipe 54 having a valve 56. A vacuum pump 58 is connected by means of conduit 60 having a valve 62 to the top of the deaerator 52 and a conduit 64, in which is placed a pump 66 and a valve 68, connects the lower portion of the deaerator with the vessel 36. When it is desired to supply make-up oil to the vessel 36, this oil is forced into the deaerator through the conduit 54. The valve 62 is opened and the pump 58 produces a vacuum in the deaerator, this serving to withdraw the air which may be entrained or in solution in the oil. The valve 68, of course, remains closed during this operation. When the air has been removed from the oil the valves 56 and 62 are closed and the valve 68 opened after which the pump 66 forces the deaerated oil into the vessel 36. It is to be understood that the particular vacuum deaerator shown is for purposes of illustration only since other means may be used for removing the air from the make-up oil without departing from the scope of the invention.

It is believed that the operation will be apparent from the foregoing description but to summarize, the air is first removed from the oil 38 in the vessel 36 as by means of the deaerator 52 and the oil 38 is then subjected to the atmosphere of hydrogen, helium or other light gas present at superatmospheric pressure in the vessel 36. The deaerated, gas-saturated oil is forced by means of pump 20 into the oil-sealed bearings 18 of the machine 10 and the oil passing through the bearings collects in the sump 26 in the bottom of the casing 12 from where it is forced by pump 28 back into the vessel 36. It will be seen that in this manner the air is prevented from entering the machine 10 and the desired gaseous atmosphere may be maintained within the casing of the machine for long periods.

Obviously many modifications and variations of the invention as above set forth may be made without departing from the spirit and scope thereof, and therefore only such limitations should be imposed as are indicated by the appended claims.

We claim:

1. In combination with a machine having a substantially gas-tight casing and a rotor member adapted to be rotated in an atmosphere of hydrogen within said casing, a shaft for said rotor, oil-sealed bearings for said shaft, an oil reservoir, means for maintaining the oil in said reservoir in an atmosphere of hydrogen, means for supplying hydrogen saturated oil from said reservoir to said bearings, means for supplying make-up oil to said reservoir and means for deaerating said make-up oil before it is placed in the reservoir comprising a closed tank for said make-up oil and a vacuum pump connected to the upper portion of said tank for removing air from the oil in said tank.

2. In a lubrication system for a machine having a casing and a rotor on a shaft within said casing adapted to rotate in an atmosphere of hydrogen, oil-sealed bearings for said shaft, means for supplying oil under pressure to said bearings, means for saturating said oil with hydrogen before it reaches said bearings, means for collecting used oil from said casing and returning said used oil to said saturating means, and means for adding deaerated make-up oil to said saturating means comprising a closed tank for said make-up oil and a vacuum pump connected to the upper portion of said tank for removing air from the oil in said tank.

3. In combination with a machine having a substantially gas-tight casing and a rotor member adapted to be rotated in an atmosphere of hydrogen within said casing, a shaft for said rotor, oil-sealed bearings for said shaft, means for supplying lubricating oil to said oil-sealed bearings and means for preventing air from passing into the casing with said oil, said last named means comprising a closed oil reservoir in which the oil is maintained in an atmosphere of hydrogen, means for supplying hydrogen saturated oil from said reservoir to said bearings, and means for supplying deaerated make-up oil to said reservoir comprising a closed tank for said make-up oil, a pipe connection between said tank and said reservoir, a valve in said pipe connection, a vacuum pump, a pipe connection between said pump and the top of said tank and a valve in said last named pump connection.

4. A method of lubricating the bearings of a machine having a rotor member rotatable in a gaseous but air-free atmosphere within a casing, which comprises removing the air from a quantity of lubricating oil, saturating the air-free oil with gas similar to that in said casing, and supplying said gas saturated air-free oil to said bearings.

5. A method of lubricating the bearings of a machine having a rotor member rotatable in a hydrogen atmosphere within a casing, which comprises saturating a quantity of lubricating oil with hydrogen, supplying said hydrogen saturated oil to said bearings, deaerating a fresh supply of oil and adding said deaerated oil to said quantity of hydrogen saturated oil.

JOHN E. ROSNELL.
JOSEPH A. TRISKA.